(No Model.)

R. E. FENNER.
FISHING REEL.

No. 476,621. Patented June 7, 1892.

Witnesses;
Percy C. Bowen
J. L. Wilson

Inventor
Richard E. Fenner,
By Whitman & Wilkinson
Attorneys.

UNITED STATES PATENT OFFICE.

RICHARD E. FENNER, OF CHICAGO, ILLINOIS, ASSIGNOR OF ONE-HALF TO CHARLES H. FALCH, OF SAME PLACE.

FISHING-REEL.

SPECIFICATION forming part of Letters Patent No. 476,621, dated June 7, 1892.

Application filed October 10, 1891. Serial No. 408,290. (No model.)

*To all whom it may concern:*

Be it known that I, RICHARD E. FENNER, a citizen of the United States, residing at Chicago, in the county of Cook and State of Illinois, have invented certain new and useful Improvements in Fishing-Reels; and I do hereby declare the following to be a full, clear, and exact description of the invention, such as will enable others skilled in the art to which it appertains to make and use the same.

My invention relates to fishing-reels; and it consists of the novel parts and arrangement thereof hereinafter described and claimed.

Reference is had to the accompanying drawings, wherein the same parts are indicated by the same letters.

Figure 1:
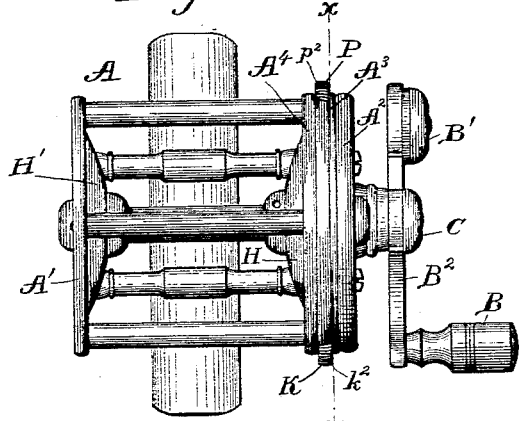
Figure 2:
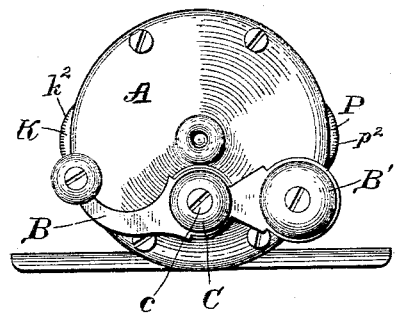
Figure 3:
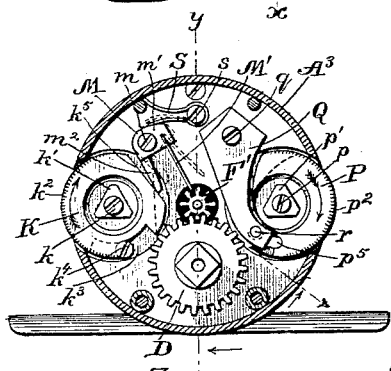
Figure 4:
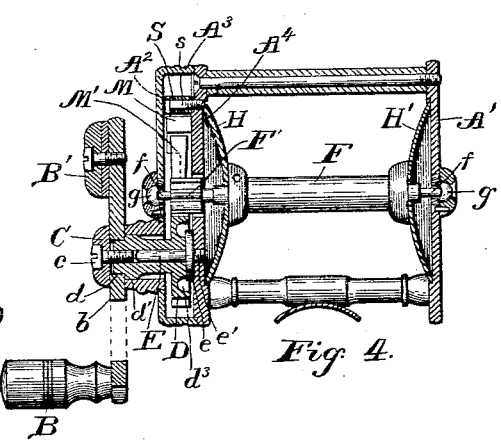
Figure 5:
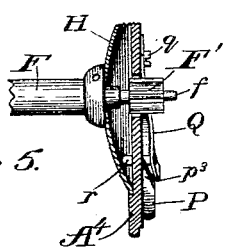
Figure 6:
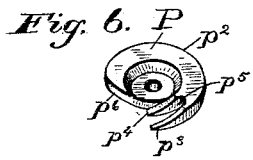
Figure 7:
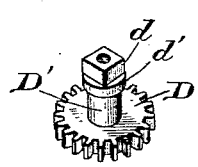

Figure 1 represents a plan view of the reel. Fig. 2 represents an end view of the reel shown in Fig. 1 as seen from the right. Fig. 3 represents a transverse section of Fig. 1 made by the plane $xx$ of Fig. 1 and looking to the left. Fig. 4 represents a longitudinal section of the reel made by the plane $yy'$ of Fig. 3 looking to the left. Fig. 5 represents a section made along the line $yz$, Fig. 3, looking to the right, and illustrates the drag or brake mechanism. Fig. 6 represents a perspective view of the cam for removing the brake, and Fig. 7 represents a perspective view of the cog-wheel connected to the handle.

The frame-work A, made in the ordinary way, has the single head A' and the double head $A^2$ and $A^4$, connected by the rim or shell $A^3$ and forming a covered space, in which are placed the cogs and the click and drag mechanism.

The handle B and counterpoise B' are attached to a bent lever $B^2$, which has a rectangular aperture stamped therein adapted to fit the square $d$ of the hollow shaft D' of the cog-wheel D. The bent lever $B^2$ is held between the flange $d'$ of the said shaft and the washer C by the screw $c$.

The shaft D' revolves upon a spindle E, screwed at $e'$ into the inner head of the reel. The disk $e$ on the said spindle E both prevents the spindle from wabbling and furnishes a bearing-surface for the inner end of the shaft D'. The cog-wheel D is cut away at $d^3$ to diminish friction. The said cog-wheel meshes with the smaller cog-wheel or pinion F', rigidly attached to the spindle F. The ends of this spindle turn in jeweled bearings $g$.

H and H' are two hollow cup-shaped flanges mounted on the spindle F.

The click mechanism consists of a disk K, a bell-crank lever M, carrying a spring M' and a bent spring S. The disk K has a cup-shaped recess in one side thereof, in which the screw $k$ holds the washer $k'$. The milled edge $k^2$ gives a good bearing to the fingers in turning the disk. The said disk is slotted at $k^3$ for the stop-screw $k^4$, which is adjusted to allow the disk to be turned by hand for a limited distance. The back $k^5$ is cut away, forming a cam, to give a wedge-like bearing for the arm $m^2$ of the bell-crank lever M. This bent lever is pivoted at $m$ and has a short arm $m'$, in which is secured the click-spring M'. This spring is normally pressed against the pinion F' by the bent spring S, which is kept under tension between the rim $A^3$ and the short arm $m'$ of the pivoted bell-crank lever M. By turning the disk K in the direction shown by the arrow in Fig. 3 the cam-face $k^5$ wedges the lever M and spring M' into the position indicated by the dotted lines, thus removing the click from the pinion F'. In order to put on the click again, the disk K is turned in the opposite direction, when the spring S throws the spring M' back against the pinion F'.

The cam P for the brake or drag is generally similar to the disk K, already described, having the cup-shaped cavity and screw $p$ and washer P' set therein. The outer edge of the cam P is milled, as at $p^2$, the edge $p^6$ is cut away, and the curved slot $p^5$ lies between two sloping faces $p^3$ and $p^4$. The flat spring Q, secured at $q$ to the disk $A^4$, has near its outer end a stud $r$, which it normally presses against the interior surface of the hollow cup-shaped flange H, thus breaking the motion of the same. In order to remove the brake or drag, the cam P is turned in the direction of the arrow. (Shown in Fig. 3.) The sloping faces $p^3$ and $p^4$ then raise the stud $r$ clear of the flange H, the stud passing along the curved slot $p^5$. To put on the drag again, turn the cam P in the reverse direction, and as soon as the sloping faces $p^3$ and $p^4$ release the end of the spring Q it will press the stud $r$ once more against the flange H.

By having the milled edges of the disk K and cam P protruding from the rim $A^3$ it is convenient to put on or take off the click or the drag while the handle B is in motion.

The various parts may be made of any suitable material; but I preferably use an alloy of aluminium for the frame-work and other portions exposed to the air. Aluminium is specially suited for the purpose, being not only very light, but it also has been found not to tarnish when wet with either salt or fresh water. I preferably use an alloy consisting of ninety-eight per cent. of aluminium and two per cent. of copper.

Having thus described my invention, what I claim, and desire to secure by Letters Patent of the United States, is—

1. In a click mechanism for fishing-reels, the combination, with a pinion attached to the spindle of the reel, of a disk K, having a cam-face upon its edge, pivoted within one head of the reel and protruding through the rim thereof, a bell-crank lever having one arm bearing against the cam-face of said disk, a click-spring attached to the other arm of the said lever, and a second spring pressing against said bell-crank lever and normally holding said lever against said cam-face and said click-spring against said pinion, substantially as described.

2. In a click mechanism for fishing-reels, the combination, with the spindle F and pinion F', attached thereto, of the pivoted disk K, having milled edge $k^2$ protruding from the rim of the reel, the curved slot $k^3$, stop-screw $k^4$, and wedging-face $k^5$, the bell-crank lever M, having arms $m$ and $m'$, the click-spring M', attached to one of the said arms, and the spring S, pressing against said bell-crank lever, substantially as and for the purposes described.

3. In a brake or drag mechanism for fishing-reels, the combination, with the spindle of the reel and a flange attached thereto, of a spring in one end of said reel, a stud in the end of said spring normally pressed by it against said flange, and a cam P, having milled edge $p^2$ protruding from the rim of said reel, grooved slot $p^5$ to receive said stud, and inclined faces $p^3$ and $p^4$, adapted to bear up the end of the said spring and raise said stud clear of said flange, substantially as described.

In testimony whereof I affix my signature in presence of two witnesses.

RICHARD E. FENNER.

Witnesses:
 CHAS. H. FALCH,
 FRED R. COX.